US005105353A

United States Patent [19]

Charles et al.

[11] Patent Number: 5,105,353

[45] Date of Patent: Apr. 14, 1992

[54] COMPRESSED LR PARSING TABLE AND METHOD OF COMPRESSING LR PARSING TABLES

[75] Inventors: Philippe G. Charles, Brooklyn; Gerald A. Fisher, Jr., Croton-on-Hudson, both of N.Y.

[73] Assignee: International Business Machines Corporation, Armonk, N.Y.

[21] Appl. No.: 393,812

[22] Filed: Aug. 11, 1989

Related U.S. Application Data

[63] Continuation of Ser. No. 115,456, Oct. 30, 1987, abandoned.

[51] Int. Cl.[5] .................................... G06F 9/45

[52] U.S. Cl. .................................... 395/700; 364/280.4; 364/280.5; 364/260.6; 364/227.4; 364/DIG. 1

[58] Field of Search .................... 364/200, 300, 900

[56] References Cited

U.S. PATENT DOCUMENTS 4,181,973 12/1980 Tseng .................... 364/900
4,679,139 7/1987 Durbin .................... 364/300 X

OTHER PUBLICATIONS

R. E. Tarjan and A. C. Yao, "Storing a Sparse Table", *Communications of the ACM,* Nov. 1979, vol. 22, No. 11, pp. 606-611.

Am M. M. Al-Hussaini and R. G. Stone, "Yet Another Storage Technique for LR Parsing Tables", *Software--Practice and Experience,* Apr. 1986, vol. 16, No. 4, pp. 389-401.

*Primary Examiner*—Thomas C. Lee
*Assistant Examiner*—William M. Treat
*Attorney, Agent, or Firm*—Bernard E. Shay; Roy R. Schlemmer

[57] ABSTRACT

A method for compressing an LR, LALR, or SLR parsing table into a compact and time-efficient representation which is machine and language independent, and allows access to table entries with a constant number of primitive operations. The primitive operations used: addition, comparison, and vector indexing, are in general very efficiently implemented on most machines, and are the key to the superior time performance of this method over other methods. Transformations are applied to the parsing table prior to compression.

11 Claims, 8 Drawing Sheets

FIG. 1

| STATE | INPUT TOKEN | | | | | |
|---|---|---|---|---|---|---|
| | id | ( | ) | + | * | eof |
| 1 | S 5 | S 6 | | S 3 | | |
| 2 | | | | S 7 | | Acc |
| 3 | S 5 | S 6 | | | | |
| 4 | | | R 1 | R 1 | S 9 | R 1 |
| 5 | | S 6 | R 8 | R 8 | R 8 | R 8 |
| 6 | S 5 | S 6 | | S 3 | | |
| 7 | S 5 | S 6 | | | | |
| 8 | | | R 2 | R 2 | S 9 | R 2 |
| 9 | S 5 | S 6 | | | | |
| 10 | | | S 12 | S 7 | | |
| 11 | | | R 3 | R 3 | S 9 | R 3 |
| 12 | | S 6 | R 10 | R 10 | R 10 | R 10 |

FIG. 2

| STATE | NON-TERMINAL SYMBOL | | | | |
|---|---|---|---|---|---|
| | E | T | F | V | R |
| 1 | G 2 | G 4 | GR4 | GR6 | GR7 |
| 2 | | | | | |
| 3 | | G 8 | GR4 | GR6 | GR7 |
| 4 | | | | | |
| 5 | | | | | GR9 |
| 6 | G 10 | G 4 | GR4 | GR6 | GR7 |
| 7 | | G 11 | GR4 | GR6 | GR7 |
| 8 | | | | | |
| 9 | | | GR5 | GR6 | GR7 |
| 10 | | | | | |
| 11 | | | | | |
| 12 | | | | | GR11 |

FIG. 3

| E | T | F | V | R |
|---|---|---|---|---|
| G 2 | G 4 | GR4 | GR6 | GR7 |

FIG. 4

| STATE | NON-TERMINAL SYMBOL | | | | |
|---|---|---|---|---|---|
| | E | T | F | V | R |
| 1 | | | | | |
| 2 | | | | | |
| 3 | | G 8 | | | |
| 4 | | | | | |
| 5 | | | | | GR9 |
| 6 | G 10 | | | | |
| 7 | | G 11 | | | |
| 8 | | | | | |
| 9 | | | GR5 | | |
| 10 | | | | | |
| 11 | | | | | |
| 12 | | | | | GR11 |

FIG. 5

| | | | | | | | | | |
|---|---|---|---|---|---|---|---|---|---|
| | G 8 | G 10 | | G 11 | GR9 | GR5 | | | GR11 |
| 3 | 5 | 6 | 7 | 9 | 12 | | | | |

FIG. 6

| | | | | | | | | | |
|---|---|---|---|---|---|---|---|---|---|
| Err | T | E | Err | T | R | F | Err | Err | R |

FIG. 7

| STATE | NON-TERMINAL SYMBOL | | | |
|---|---|---|---|---|
| | R | T | F | E |
| 6 | | | | G 10 |
| 9 | | | GR5 | |
| 3 | | G 8 | | |
| 7 | | G 11 | | |
| 5 | GR9 | | | |
| 12 | GR11 | | | |

FIG. 8

| R | T | F | E | V |
|---|---|---|---|---|
| GR7 | G4 | GR4 | G2 | GR6 |

| | | G8 | G10 | GR5 | G11 | GR9 | GR11 |
|---|---|---|---|---|---|---|---|
| 6 | 3 | 9 | | 7 | | 5 | 12 |

| Err | Err | T | E | F | T | R | R | Err | Err |
|---|---|---|---|---|---|---|---|---|---|
| 6 | 3 | 9 | | 7 | 1 | | 5 | | 12 | | | 11 |

| Err | Err | T | E | F | T | R | R | Err | Err |

| T6 | T3 | T9 | G8 | G10 | GR5 | T7 | T1 | G11 | T5 | GR9 | T12 | GR11 | T2 | T4 | T8 | T10 | T11 |
|---|---|---|---|---|---|---|---|---|---|---|---|---|---|---|---|---|---|
| 6 | 3 | 9 | | | | 7 | 1 | | | | 12 | | 2 | 4 | 8 | 10 | 11 |

| Err | Err | T | E | F | Err | E | R | R | Err | Err | Err |

| T6 | T3 | T9 | 27 | 28 | 5 | T7 | T1 | 29 | T5 | 9 | T12 | 11 | T2 | T4 | T8 | T10 | T11 |
|---|---|---|---|---|---|---|---|---|---|---|---|---|---|---|---|---|---|
| 12 | 13 | 14 | 15 | 16 | 17 | 18 | 19 | 20 | 21 | 22 | 23 | 24 | 25 | 26 | 27 | 28 | 29 |

FIG. 14

| STATE | INPUT TOKEN | | | | | |
|---|---|---|---|---|---|---|
| | id | ( | ) | + | * | eof |
| 1,6 | S 5 | S 6 | | S 3 | | |
| 2 | | | | S 7 | | Acc |
| 3,7,9 | S 5 | S 6 | | | | |
| 4 | | | R 1 | R 1 | S 9 | R 1 |
| 5 | | S 6 | R 8 | R 8 | R 8 | R 8 |
| 8 | | | R 2 | R 2 | S 9 | R 2 |
| 10 | | | S 12 | S 7 | | |
| 11 | | | R 3 | R 3 | S 9 | R 3 |
| 12 | | S 6 | R 10 | R 10 | R 10 | R 10 |

FIG. 15

| STATE | INPUT TOKEN | | | | | | |
|---|---|---|---|---|---|---|---|
| | def | id | ( | ) | + | * | eof |
| 1,6 | Err | S 5 | S 6 | | S 3 | | |
| 2 | Err | | | | S 7 | | Acc |
| 3,7,9 | Err | S 5 | S 6 | | | | |
| 4 | R 1 | | | | | S 9 | |
| 5 | R 8 | | S 6 | | | | |
| 8 | R 2 | | | | | S 9 | |
| 10 | Err | | | S 12 | S 7 | | |
| 11 | R 3 | | | | | S 9 | |
| 12 | R 10 | | S 6 | | | | |

FIG. 16

| STATE | INPUT TOKEN | | | | | | |
|---|---|---|---|---|---|---|---|
| | def | ( | * | + | id | ) | eof |
| 1, 6 | Err | S 6 | | S 3 | S 5 | | |
| 2 | Err | | | S 7 | | | Acc |
| 3,7, 9 | Err | S 6 | | | S 5 | | |
| 10 | Err | | | S 7 | | S 12 | |
| 4 | R 1 | | S 9 | | | | |
| 5 | R 8 | S 6 | | | | | |
| 8 | R 2 | | S 9 | | | | |
| 11 | R 3 | | S 9 | | | | |
| 12 | R 10 | S 6 | | | | | |

FIG. 17

| | | | | | | | | | | | | | | | | | | | | | | |
|---|---|---|---|---|---|---|---|---|---|---|---|---|---|---|---|---|---|---|---|---|---|---|
| Err | S6 | Err | S3 | S5 | S7 | Err | S6 | Acc | Err | S5 | R1 | S7 | S9 | S12 | R8 | S6 | R2 | R3 | S9 | S9 | R10 | S6 |
| 1,6 | | 2 | | | | 3,7,9 | | | 10 | | 4 | | | | 5 | | 8 | 11 | | | 12 | |

FIG. 18

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| Err | ( | Err | + | id | + | Err | ( | eof | Err | id | Err | + | * | ) | Err | ( | Err | Err | * | * | Err | ( | Err | Err | Err | Err | Err |

FIG. 19

| | | | | | | | | | | | | | | | | | | | | | | |
|---|---|---|---|---|---|---|---|---|---|---|---|---|---|---|---|---|---|---|---|---|---|---|
| 31 | 12 | 31 | 13 | 21 | 18 | 31 | 12 | 30 | 31 | 21 | 1 | 18 | 14 | 23 | 8 | 12 | 2 | 3 | 14 | 14 | 10 | 12 |
| 1,6 | | 2 | | | | 3,7,9 | | | 10 | | 4 | | | | 5 | | 8 | 11 | | | 12 | |

FIG. 20

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| 0 | 1 | 0 | 3 | 4 | 3 | 0 | 1 | 6 | 0 | 4 | 0 | 3 | 2 | 5 | 0 | 1 | 0 | 0 | 2 | 2 | 0 | 1 | 0 | 0 | 0 | 0 | 0 |

FIG. 21

| | | | | | | | | | | | | | | | | | |
|---|---|---|---|---|---|---|---|---|---|---|---|---|---|---|---|---|---|
| 1 | 7 | 7 | 27 | 28 | 5 | 7 | 1 | 29 | 16 | 9 | 22 | 11 | 3 | 12 | 18 | 10 | 19 |
| 12 | 13 | 14 | 15 | 16 | 17 | 18 | 19 | 20 | 21 | 22 | 23 | 24 | 25 | 26 | 27 | 28 | 29 |

FIG. 22

| | | | | | | | | | | |
|---|---|---|---|---|---|---|---|---|---|---|
| 0 | 0 | 2 | 4 | 3 | 2 | 1 | 1 | 0 | 0 | 0 |
| 12 | 13 | 14 | 15 | 16 | 17 | 18 | 19 | 20 | 21 | 22 |

FIG. 23

GOTO DEFAULT TABLE

| | | | | |
|---|---|---|---|---|
| 7 | 26 | 4 | 25 | 6 |
| R | T | F | E | V |

COMPRESSED LR PARSING TABLE AND METHOD OF COMPRESSING LR PARSING TABLES

This is a continuation of application Ser. No. 07/115,456, filed Oct. 30, 1987, now abandoned.

DESCRIPTION

1. Field of the Invention

This invention relates to data processing in general and a method for compressing a parser in particular.

2. Description of the Prior Art

Compilers, which are used to translate higher level languages, such as ADA, C, etc., into machine readable form (machine language) often include a parser that parses a line of source code into its component parts in the same manner that a student of English might parse a sentence into its subject, verb and object, to ascertain its correctness. After the parser has done its work, other parts of a compiler then perform the actual translation of the source code into machine code.

In recent years, new languages have been designed with, and preexisting languages specified by, a complete grammar. As with the grammar of any language, whether it is a computer language or human language, the grammar sets out the rules that determine which grammatical structures are permissible. From these computer language grammars one may generate an LR (left-right) parser consisting of a table in a matrix form in which the rows represent the states of the parser and the columns represent the input to the parser. The intersection of the rows and columns holds the action that results from a given input to a particular state of the parse. The matrix is thus used to store the characteristics of an automaton or machine that obeys, for example, the grammatical rules of the language.

In terms of speed performance, the matrix is a very efficient method for storing an LR automaton since it may be presented to a processor in the form of a lookup table. Unfortunately, the amount of space required by the matrix is determined by the number of rows and columns rather than the number of significant (non-error) entries that it contains. For example, for a language such as ADA, there may be some 500 states and 400 possible inputs. This results in a matrix having 200,000 entries, LR tables, in general, contain very few significant entries typically occupying no more than 2% of the matrix. The remaining 98% of the matrix space contains non-significant information, e.g. zeroes. It is desirable therefore to choose a representation that is close to the matrix in time efficiency but requires an amount of space that is proportional to the number of significant entries in the table.

It is also possible to represent an automaton in a graphical form, which essentially shows a linkage of the possible states according to the input. Such a representation has the advantage of compactness since it needs only to be as large as the number of significant entries. An automaton based on such a representation is quite slow, however, since each link of the chain must be explored until the desired state and input are found.

A number of methods are known in the art for the compression of LR parse tables. Most LR parser generator systems do provide compressed parse tables. Usually the compression is achieved by the use of hashing or linear lists. These data structures are very general and their application to parse table compression has generally not been described in the literature.

In the hashing method a hash table is used to represent a sparse matrix. The row and column indices are "hashed" to form an index into a single table. The table must not only contain the parse action but also the row and column index in order to check for hash collisions and for errors. The space requirement of hashed parse tables is excessively high. Also, the checking of row and column indices adds to the parse time. In the present invention the table compression produces parse tables that need less than half as much space as those produced by hashing methods.

In methods using linear lists substantial space savings result when the parse matrix entries are stored in a linear list. The list, however, must be searched sequentially when a parse action is needed. Therefore, the time required to determine a parse action is not constant, but depends on the number of parse matrix entries. This method does save space, but at the expense of time. This method is discussed in Aho, Sethi, Ullman "Compilers: Principles, Techniques, and Tools", Addison-Wesley, 1986 at page 245.

In methods using row displacement the rows of a sparse parse matrix are "overlaid" on each other in a one dimensional table. An auxiliary table is needed to retrieve the starting index of each row in the overlay table. Also, each entry in the overlay table must have an associated "check" entry to verify that the indexed location corresponds to a valid entry. This method was proposed by Ziegler, S. F. "Smaller Faster Table Driven Parser", (unpublished manuscript) Madison Academic Computing Center, Univ. of Wisconsin, Madison 1977 and has been used (together with other methods) in the YACC parser generator, Johnson, S. C. "YACC—Yet another compiler compiler". CSTR32, Bell Laboratories, Murray Hill, N.J. 1975. This method does well with respect to parse action time, but its space requirements can be excessive. Space efficiency with this method depends very much on how the rows are overlaid. The method according to the present invention does, to some extent, use row displacement, but uses a novel technique for the overlay of rows that in practice tends to minimize the number of unused entries in the one dimensional table.

The method of graph coloring, proposed by Dencker, Durre, and Heuft in Denker, P., Durre, K., Heuft, J. "Optimization of Parser Tables for Portable Compilers," pp. 546-572, ACM TOPLAS Volume 6, Number 4, October 1984, seeks to reduce the number of entries in the original matrix by identifying rows and columns with the compatible entries. A graph coloring algorithm is used to reduce the parse matrix to a smaller action matrix and a Boolean check matrix. The result is very small parse tables that can be accessed relatively quickly. The present invention also reduces the number of terminal action entries by identifying compatible rows although a different method, which does not require a Boolean check matrix, is used. In Dencker et al. a Boolean matrix must be accessed for each terminal action. On most machines this form of access is much slower than simple table indexing.

SUMMARY OF THE INVENTION

The present invention provides a method for compressing an LR parsing table as used in compiling a computer language. The method first merges states having the same or comparable actions. It then overlays adjacent rows of the matrix table in a vector representation to eliminate non-significant entries. Third, it encodes the state number for use as an index into the compressed table.

Thus, it is an object of the present invention to provide a compressed parsing table that can be stored in a memory space proportional to the number of significant entries within the parsing table.

It is yet another object of the invention to provide a parsing table representation that may be compactly stored yet can be operated upon more rapidity than a corresponding matrix representations.

It is still a further object of the invention to provide smaller parsing tables than the known methods and with considerably faster access times.

These and other objects, features and advantages of the invention will become more apparent upon reference to the attached specification and the drawings described below.

BRIEF DESCRIPTION OF THE DRAWINGS

FIG. 1 is a terminal action matrix for a sample grammar;

FIG. 2 is a non-terminal action matrix for a sample grammar;

FIGS. 3-5 show a method for compressing LR tables according to the prior art;

FIGS. 6-23 show the compression of the sample grammar according to the method of the present invention.

DETAILED DESCRIPTION OF THE PREFERRED EMBODIMENTS

Figure 9:
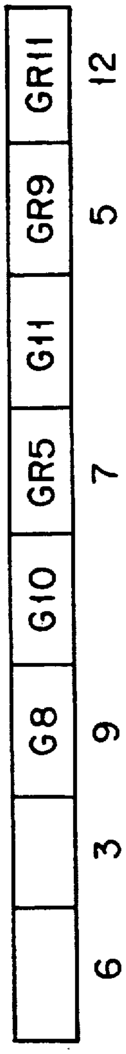

An LR parsing table for a computer language summarizes the grammar of the language. It can be described as a matrix in which the rows represent the states of a stack-driven, finite state automaton, the columns represent the symbols of the language, and the value of each element of the matrix, called the "action", represents either a transition of the automaton or an error. The automaton is stack-driven since during a parse an auxiliary stack is used to keep track of the path in the automaton that was taken from the start state to the current state.

The stack initially contains only the start state of the automaton. At any time during a parse the parser is in the state indicated by the top of the stack and it has access to the first token symbol in an input stream. Two kinds of transitions can occur: 1) A forward transition to a new state which involves pushing the new state onto the stack, and 2) a regression which involves removing zero or more states off the top of the stack.

The symbols of a computer language can be divided into two categories: 1) terminals, and 2) non-terminals.

Terminals are symbols that may be used as actual input tokens, that is, for example, instructions in the language provided by the person writing a program. Non-terminals are symbols that represent phrases in the language that are used internally by the language.

This categorization of the symbols allows the parsing table to be broken up into two logically separate tables, 1) a Terminal Action table with the states as rows and the terminals as columns, and 2) a Non-Terminal Action Table or Goto table with the states as rows and the non-terminals as columns. A terminal action table and a non-terminal action table are shown in FIGS. 1 and 2 respectively, for a grammar to be described below.

Since the LR parser is an automaton whose actions computed with the current state and current symbol determine the next state and the next symbol, the direct access property of the matrix does not have to be preserved. In other words, the only way the automaton can be in a state S is if a forward transition takes it to S, or a forward transition had previously placed S in the stack, and a regression brings it back to S. Therefore, only forward transition entries to S need to have access to it.

The above description of a parsing table can be better understood by referring to an example. The following example will be used throughout the remainder of this specification to explain parsing tables in general and the present invention in particular.

The example chosen is a grammar for generating simple arithmetic expressions such as a+b, a*b, or a*-(a+b). It includes terminal symbols, non-terminal symbols, and 11 rules as follows:

Terminal Symbols: id ( )+ *eof

Non-Terminal Symbols: E T F V R

Rules:

| | | | |
|---|---|---|---|
| 1. | E | ::= | T |
| 2. | E | ::= | + T |
| 3. | E | ::= | E + T |
| 4. | T | ::= | F |
| 5. | T | ::= | T * F |
| 6. | F | ::= | V |
| 7. | F | ::= | R |
| 8. | V | ::= | id |
| 9. | V | ::= | id R |
| 10. | R | ::= | ( E ) |
| 11. | R | ::= | ( E ) R |

Terminal symbols are those which are ordinarily provided by the user. Thus if the user had provided the statement a+b, the terminal symbols are a, b and +.

The terminal symbol "id" stands for an identifier, which is in this case a variable such as a, b, c or x, y, z. The terminal symbol "eof" is special because it marks the end of input. An example of an expression generated by this grammar is:

id+id(id)

This expression is "parsed" by taking as input the sequence of "tokens":

id+id(id) eof

The tokens are "read" from left to right and one or more parsing "actions" are taken as each token is read. The parse requires an auxiliary "stack" to remember the "results" of earlier parsing actions. These results are called states, and the stack that holds them is called the "state stack". At any given moment during a parse some number of input tokens have been consumed and the results of doing so recorded on the state stack. When an "eof" token is reached, the input may be "accepted" and the parse is complete. If the input sequence of tokens does not belong to the language generated by the grammar (that is, if the input is not a permissible expression in the example grammar), an "error" is signaled and the parse stops or "blocks."

The non-terminal symbols are intermediate symbols, transparent to the user, whose meaning is actually dependent on the rules.

The rules, labelled 'through 11, establish which reductions may legally take place. The symbol ::= is a unidirectional equivalence symbol going from right to left. Referring to Rule 1, for example, the statement E::=T means that T can be replaced with (i.e., reduced to) E.

Rules 1-11 of the example preserve standard arithmetic hierarchies or operator priority. Thus in the expression a+b*c, the multiplication operation b*c will be performed first and followed by the addition operation +. This is reflected in the rules, in which final reduction, if possible, is to Rule 1. Rule 2, which includes the addition operator, is closer to the final reduction by Rule 1 than Rule 5 which contains the multiplication operator.

The parser is controlled by tables that specify an action to take given the current input token and the current state on the top of the state stack. These tables (or matrices) contain the actions for a particular grammar. Examples of such matrices are shown in FIGS. 1 and 2, which will be described in greater detail below.

There are a total of seven possible actions that can take place during the parse. There are five possible actions that can take place according to the terminal action matrix and two according to the non-terminal action matrix. An entry in the Terminal Action table can have one of five values:

TERMINAL ACTIONS (1) Shift to state n: Shift n means "shift" input (that is, the next input symbol becomes the current symbol), and make n the current state and push n onto the state stack. A shift action is a forward transition, and the table entry associated with it is the next state that the parser is to enter. Generally, in a shift, the next new symbol in the input stream is accepted for parsing.

(2) Reduce by p: Apply grammar rule p. This is done by removing (popping off) states, one for each symbol in the right hand side of rule p, from the state stack, making the state now on the top of the state stack the current state, and taking a non-terminal action on the symbol on the left-hand side of rule p. A reduce action is a regression, and the table entry associated with it is an integer that represents a rule number. The number of states, k, that are to be removed from the top of the stack is computed as the length of the right hand side. After the execution of a reduce action, the left hand side of the rule that was reduced becomes the current input symbol and is placed in front of the rest of the token stream.

(3) Shift/Reduce by p: A shift input action that is immediately followed by a reduce by rule p. A shift-reduce action is equivalent to a shift action to an arbitrary state followed by a reduce action. The table entry associated with a shift-reduce action is a rule number.

(4) Accept: Signals that the input has been successfully parsed. The parse is complete. There is only one accept action in any parsing table.

(5) Error: The error action—stop the parse and reject the input. No further parsing is possible; the input is in error.

The non-terminal action matrix is used for non-terminal actions following a reduce action. An entry in the Goto table can have one of two possible values:

NON-TERMINAL ACTIONS (1) Goto n: Push state n onto the state stack, making state n the current state. A goto action is a forward transition, and the table entry associated with it is the next state that the parser is to go into. The next action is a terminal action.

(2) Goto-Reduce p: Perform a Goto action on an unnamed state immediately followed by a Reduce p action. A goto-reduce action is equivalent to a goto action to any arbitrary state followed by a reduce action. The table entry associated with a goto-reduce action is a rule number.

Although the non-terminal action matrix may have void entries, there are no error entries.

The "Reduce" actions are the most important since they permit the reconstruction of the derivation of the input according to the rules of the grammar. For example, the expression, id+id, is generated from the Non-Terminal Symbol E.

Derivation is started from the non-terminal symbol E and some rule is then applied to the rightmost non-terminal symbol of the sequence generated thus far. The number of the rule applied is shown beneath the symbol "=>" as follows:

$$E \underset{3}{=>} E+T \underset{4}{=>} E+F \underset{6}{=>} E+V \underset{8}{=>} E+id \underset{1}{=>} T+id \underset{4}{=>} F+id \underset{6}{=>} V+id \underset{8}{=>} id+id$$

Thus, E is first rewritten using rule 3 to obtain E+T; then T is rewritten using rule 4 to obtain E+F; then the F is rewritten as a V using rule 6; etc. The derivation stops when no non-terminal symbols remain to be rewritten and results in the expression id+id.

The parse of an input sequence generates the reverse of a derivation through its reduce actions. Thus in this example:

$$id+id \underset{8}{<=} V+id \underset{6}{<=} F+id \underset{4}{<=} T+id \underset{1}{<=} E+id \underset{8}{<=} E+V \underset{6}{<=} E+F \underset{4}{<=} E+T \underset{3}{<=} E$$

The parse action are as follows:

1) Start in a state that expects an E. 2) Shift to a state that expects a V and read the leftmost id token. 3) Reduce by rule 8. 4) Goto/Reduce on rule 6. 5) Goto/-Reduce on rule 4. 6) Goto a state that remembers a T has been parsed. 7) Reduce by rule 1. 8) Goto a state that remembers an E has been parsed. 9) Shift to a state that expects a T and read the + token. 10) Shift to a state that expects a V and read the leftmost id token. 11) Reduce by rule 8. 12) Goto/Reduce on rule 6. 13) Goto/Reduce on rule 4. 14) Goto a state that remembers a T has been parsed. 15) Reduce by rule 3. 16) Accept the eof token. The states of the parser are encoded as numbers, as are the terminal and non-terminal symbols. Rule numbers are used to represent the rules.

Examples of the terminal action and non terminal action matrices for the sample grammar are shown in FIGS. 1 and 2, respectively. In this example the states are shown as numbers, starting from 1, but for clarity, numbers have not been assigned to the symbols. The entries of the matrices are the parse actions described above. These actions are abbreviated in the matrices as follows:

| | |
|---|---|
| S n | Shift to state number n |
| G n | Goto state number n |
| R k | Reduce by rule number k |
| SR k | Shift/reduce by rule number k |
| GR k | Goto/reduce by rule number k |
| Acc | Accept action |
| Err | Error |

The non-terminal action matrix contains the goto and goto/reduce actions. The terminal action matrix contains the shift, shift/reduce, reduce, and accept actions. An error action is indicated by an empty entry.

The terminal action matrix of an LR parser for the sample grammar is as shown in FIG. 1 and the non-terminal action matrix (or goto matrix) is shown in FIG. 2. Both of these matrices are in general very sparse (i.e., most of the entries are Error actions). In this example the terminal action matrix is about half full while the non-terminal matrix is about one third full.

These two matrices can be used as they are, although they contain many empty entries. The goal of the compression technique according to the present invention is to eliminate as many entries as possible and then compress each matrix into a simple linear (one dimensional) table.

The parsing of an input sequence is controlled by these matrices and a "state stack" that remembers the form of the input parsed thus far. The "states" are encoded as row indices of the action matrices. There is an initial or start state in which the parse begins. This is state 1 by convention. The parse starts with state 1 on the state stack. In addition, there is a special input symbol "eof" that is appended to the end of the input sequence to signal that the input is complete.

These matrices are used as follows. The "current state" is always the state at the top of the state stack. The "current input" is the symbol currently being read. To obtain the action for the current input symbol, the current state and current input symbol are used as row and column indices, respectively, of the terminal matrix. A shift action gets the next input symbol and pushes a new current state on the state stack. A reduce action removes states from the state stack and performs a non-terminal action on the non-terminal symbol corresponding to the left hand side of the rule being reduced.

This may be better understood by considering the example of "A+B". This becomes "A+B eof", the eof symbol providing a marker indicating the end of the expression. In this example the first input token is A (an id terminal symbol). Thus referring to FIG. 1, the first action is found by referring to the state 1 row and the id column. The action located there is S 5 which means to shift the input and push state 5 onto the state stack. The next token in the input stream, "+", becomes the current input symbol and state 5, on the top of the state stack, becomes the current state. Therefore, the terminal action to be taken, indicated under the "+" input token in row 5, is R 8, signifying that there should be a reduction according to rule 8, which reduces id to V.

The reduce action removes one state from the state stack, state 5, since the right hand side of rule 8 contains only one symbol. Thus, the current state is now 1. A non-terminal action on V, the left hand side of rule 8, is now performed. Thus look under the column marked V, in the state 1 row to find the next action, which is GR6. This is a Goto an unnamed state immediately followed by a reduce using rule 6. The length of the right hand side of rule 6 is one, so the unnamed state pushed onto the stack is immediately removed by the reduce action. Hence, the unnamed state may be arbitrarily chosen. As a result the current state remains state 1. Rule 6 reduces V to F. Since the automaton is still in state 1 now look under the F column, which contains the action GR 4, a Goto Reduce by rule 4. An unnamed state is pushed onto the state stack and then removed since the right hand side of rule 4 has only one symbol. Rule 4 reduces F to T. Still in state 1, now look under the T row, and find the action G4, Goto state 4. State 4 is pushed onto the state stack, making it now contain the sequence 1, 4. The next action is a terminal action. The symbol "+" is still the current symbol and state 4 is the current state.

Next, in the terminal action matrix look under the token "+" for state 4 which generates a reduce by rule 1, which reduces T to E. The reduce action removes state 4 from the top of the stack, making state 1 the current state. A non-terminal action is then performed using symbol E, the left hand side of rule 1. The action at row 1 and column 1 is G2, that is, Goto state 2. State two is pushed onto the state stack. The state stack now contains the sequence 1, 2 with the current state being state 2. The current input symbol is still "+". A terminal action is now required.

In state 2 the terminal action for "+" is S7, which means shift input and push state 7 onto the state stack. The state stack becomes 1, 2, 7 with state 7 as the current state. The next input symbol is "B", an "id", which becomes the current input symbol. A terminal action is taken.

In state 7 the terminal action for "id" is S5, which means shift input and push state 5 onto the state stack. The state stack now becomes 1, 2, 7, 5 and "eof" becomes the current input symbol. The current state is now 5.

In state 5 the terminal action for "eof" is R8, a reduce id to V. This reduction removes state 5 from the top of the state stack and performs a non-terminal action on V in new current state 7. This action is GR6, Goto reduce by rule 6, F=>V. An unnamed state is pushed and then popped from the state stack, leaving 7 as the current state. A non-terminal action on F in state 7 is then performed. This action is GR4, Goto Reduce by rule 4, T=>F. An unnamed state is pushed and popped form the state stack, leaving 7 as the current state. A non-terminal action on T in state 7 is then performed. This action is G11, Goto 11, which pushes state 11 onto the state stack. The state stack is now 1, 2, 7, 11; state 11 is the current state and "eof" is the current input symbol. A terminal action is now taken.

In state 11 the terminal action for "eof" is R3, Reduce by rule 3, E=>E+T. The length of the right hand side of this rule is 3 so three states are removed from the top of the state stack making it contain only state 1. A non-terminal action is now taken with state 1 as the current state and E, the left hand side of rule 3, as the non-terminal symbol. The action given by the non-terminal action matrix is G2, that is, Goto 2, which pushes state 2 onto the state stack. The state stack now contains 1 and 2 with state 2 as the current state. The current input symbol is still "eof". The next action is a terminal action.

In state 2 the terminal action for "eof" is Acc, the Accept action. Therefore, the parse is successfully completed for this input sequence.

Action matrices of the type discussed above are in general quite large and matrix access is generally costly. In the example of FIGS. 1 and 2 there are 132 total entries of which 61 are non-error entries. Grammars for modern programming languages produce matrices with more than 200,000 entries, and typically, all but some 4,000 (or 2%) of them are error entries.

Another automaton that is isomorphic to the original and recognizes the same language may be created by permuting the rows and the columns of the matrix, and changing the forward transition entries accordingly. In fact, permuting the rows constitutes a relabeling of the states; and likewise, permuting the columns constitutes a relabeling of the symbols.

These observations form the basis of the table compression technique according to the present invention. Assuming a parser with Q states, M terminals, and N non-terminals, the Action table has dimensions: [1 . . . Q, 1 . . . M] with the terminal symbols occupying column positions 1 through M, and the Goto table has dimensions: [1 . . . Q, 0 . . . N] with the non-terminals occupying column positions 1 through N. The 0th column added to Goto table is assumed to contain only significant entries as will be described in further detail below.

Typically one addition, one subtraction and one multiplication is required to access the element in the Ith row and Jth column of an N×M matrix. In the present invention, the Goto table is compressed into a single vector called BASE_ACTION. Each state S is represented by an index in BASE_ACTION where the row of the Goto matrix corresponding to state S was placed. Thus, given a non-terminal A, represented by a column index of the Goto matrix, the action in state S for symbol A can be computed as BASE_ACTION(S+A), that is, by indexing the BASE_ACTION table with the index S+A. Hence, the cost of computing a non-terminal action using this method, one addition and one indexing operation, is less than the cost of computing an action using the matrix representation. This result is significant because during a parse the majority of actions that are computed are non-terminal actions.

The number of significant entries in the BASE_Action vector is equal to the number of significant entries in the Goto table plus the number of state in the automaton. Usually, no more than 5% of the BASE_ACTION elements will be unused. Nevertheless, a significant space improvement can be obtained at the expense of time by using a variation of this method which involves two more vectors: BASE_CHECK and GOTO_DEFAULT.

The BASE_CHECK vector is used in parallel with the BASE_ACTION vector and for each state S and each non-terminal symbol A, BASE_CHECK(S+A) equals A only if a non-terminal action is defined on A in state S. The GOTO_DEFAULT vector contains a default action for each non-terminal. The default action for a non-terminal A is the one that appears most often in the GOTO matrix.

With the new representation, the action defined on a state S and non-terminal A can be computed using the following algorithm:

```
if BASE_CHECK(S + A) = A then
    yield BASE_ACTION(S + A); /*action is
                                BASE_ACTION(S+A)*/
else yield GOTO_DEFAULT(A);   /*otherwise action
```

This alternative representation has an additional time-cost of one indexing operation and one comparison, specifically, the indexing of the BASE_CHECK vector with S+A and the comparison for equality of BASE_CHECK(S+A) to A. It may, however, save as much as 50% of the space originally required by BASE_ACTION.

The action table is compressed into two parallel vectors: TERM_ACTION which contains actual terminal action entries, and TERM_CHECK whose elements are used to confirm the validity of corresponding elements in TERM_ACTION. The number of significant entries in these tables are generally less than the number of significant entries in the Action table. This saving is obtained because many of the rows in the Action table are combined before being placed in TERM_ACTION. The action defined on a state S and a terminal symbol t may be computed using the following algorithm:

```
SS := BASE_ACTION(S);              /*let SS=BASE
                                     _ACTION(S)*/
if TERM_CHECK(SS + t) = t then
  yield TERM_ACTION(SS + t);       /*action is TERM
                                     _ACTION(SS+t)*/
else yield TERM_ACTION(SS);        /*otherwise action is
                                     TERM_ACTION(SS)*/
```

Once again, the cost of computing a terminal action, which is three indexing operations, one addition and one comparison, is fairly close to the cost of a matrix element access.

The parser requires a vector that contains the left-hand side symbol of each rule and a vector that contains the length of the right-hand side of each rule. The BASE_ACTION vector, representing the Goto matrix and the BASE_CHECK vector (when Goto defaults are used) are appended to these two auxiliary vectors. Thus, the lower bound for the base vectors is the number of rules in the language plus 1.

If Goto defaults are taken, the most frequently occurring action for each non-terminal is removed from the Goto matrix wherever it appears. A vector, GOT_DEFAULT, is used to associated with each non-terminal symbol its "default", or most frequently occurring, action.

As indicated earlier, the rows and columns of the Goto matrix may be permuted without affecting the parser. The rows and columns are permuted so that they are ordered by the number of actions they contain. That is, the row with the most actions will be the first row and the column with the most actions will be the first column. This step of the invention is important because it tends to concentrate the significant action entries in the upper triangular part of the matrix. The result is that the denser rows appear first, and the actions of each row tend to cluster starting from the first column. An extra column, indexed by zero, is appended to the permuted matrix. This column contains the original index of each row and thus represents the permutation applied to the rows. This column is needed because each shift and goto action must be renumbered according to the permutation of the states. In the construction of the BASE_ACTION vector this column is also used to provide an index position for the terminal actions of the corresponding state.

The permuted Goto matrix is then compressed to form the BASE_ACTION vector. The compression algorithm is as follows: Each entry of the BASE_ACTION vector is initially set to a special value indicating that the entry is "undefined". Each row, in turn, of the permuted Goto matrix is "compared" with the unused part of the BASE_ACTION vector. The comparison starts with the first available undefined entry of the BASE_ACTION vector and succeeds if it is determined that each significant entry of the row of the Goto matrix corresponds to an undefined entry of the BASE_ACTION vector. If the comparison does not succeed, the next available undefined entry of the BASE_ACTION vector is tried, and the process is repeated. Eventually the comparison must succeed. The row of the Goto matrix is overlaid on the BASE_ACTION vector at the point where the comparison is successful. This algorithm is summarized in the following pseudo code:

```
Set all entries of BASE_ACTION to Undefined
  For each Row I in Permuted Goto matrix do
    For each J such that BASE_ACTION(J) equals
    undefined do if for all K such that Goto(I, K)
    is significant then
      if BASE_ACTION(J + K) is Undefined then
        Set BASE_ACTION(J + K) to Goto(I, K) for
        all such K and continue with the next Row I.
```

Since the 0th element of each row will contain a significant entry, each row is guaranteed to start on a unique location. The frequency sorts of the rows and columns as described above help in achieving a good comparison. Since the densest rows are placed in BASE_ACTION first, the gaps that they create are later filled by the sparser rows, many of which contain only one or two entries.

States can now be represented by the index of their 0th element in BASE_ACTION. Thus given a state S, an action defined in S on a symbol x can be obtained by adding x to S and indexing BASE_ACTION with the result.

All forward transitions (goto actions) in BASE_ACTION are changed to reflect the new labeling of the states. A special variable, START_STATE, is used to keep the value of the start state of the automaton. The value of the accept action (ACCEPT_ACTION) is encoded as the value of the highest index used by a Goto row in BASE_ACTION plus 1. The value of the error action (ERROR_ACTION) is encoded as ACCEPT_ACTION+1. All positions within BASE_ACTION (up to the last index that contains a significant entry) that are still undefined are assigned ERROR_ACTION. When Goto defaults are used the non-terminal action entry for a given state and input symbol obtained from the BASE_ACTION table need not be correct and so must be checked against the parallel BASE_CHECK table. Since each row starts in a unique location in BASE_ACTION, each symbol within a row on which a significant action is defined also has a unique position. Therefore the BASE_CHECK vector that corresponds to a significant entry in the BASE_ACTION vector contains the symbol on which the significant entry is defined. Elements of BASE_CHECK that correspond to ERROR_ACTION entries in BASE_ACTION are assigned the value 0. The upper bound of BASE_CHECK must be extended so as to accommodate a check on the highest non-terminal on which an action is defined in the Goto row that acquired the highest index in BASE_ACTION.

Two vectors, TERMINAL_ACTION and TERMINAL_CHECK, are used to represent the terminal action matrix. The TERMINAL_CHECK vector has the same function as the BASE_CHECK vector: that is, for a given state and terminal input symbol, the computed TERMINAL_CHECK vector entry validates the corresponding entry in the TERMINAL_ACTION vector.

The TERMINAL_CHECK vector is required because the input may be in error and because default reductions are used.

Before compressing the terminal action matrix into a vector, two steps are taken to reduce the number of significant entries. These are: the merging of compatible states, and the replacing of the most frequent reduce action in each row by a default reduction.

A state S2 is said to be compatible with another state S1 if the following conditions are satisfied:

1. S1 has the same shift and shift-reduce entries as S2.

2. The set of rules involved in the reduce actions of S2 is the same as the set of rules involved in the reduce actions of S1.

3. For each terminal symbol t for which a reduce action is defined in both state S1 and S2, the reduce actions are identical.

First the states of the automaton are partitioned, and thereby the rows of the terminal action matrix, into compatibility classes. Begin with a coarse partition based only on condition (1) above: states are compatible if their shift and shift-reduce entries correspond. The shift entries for a given state may be represented by its "shift map", that is, by a set of pairs consisting of a terminal symbol and the shift or shift-reduce action that is to be taken on the symbol in the given state. All of the states in a compatibility class have the same shift map.

The reduce entries for a given state may be represented by its "reduce map", that is, by a set of pairs consisting of a terminal symbol and the reduce action to be taken on the symbol in the given state. Each shift may compatibility class can be further partitioned according to the reduce maps of the states in the class. This partitioning is based on conditions (2) and (3) above.

After the partitioning is complete, the states in each class are merged into a single state as follows: the shift and shift-reduce entries are common; a reduce action is included if it occurs in any one of the states in the given class. The rows of the terminal action matrix are then redefined to correspond to the merged states.

Next a "default reduction" action is computed for each row of the modified terminal action matrix and is entered into the 0th column of the given row. The default reduction is simply the most frequently occurring reduce action in that row, if there are any, and is the error action otherwise.

The terminal action matrix, with coalesced rows and appended default reduction column, is then compressed using the same algorithm that is used to compress the Goto matrix. The result is the TERMINAL_ACTION table and the TERMINAL_CHECK table. All shift actions (forward transitions) in the TERMINAL_ACTION table are changed to reflect the same labelling of the states used in BASE_ACTION. Each shift-reduce action rr is encoded as ERROR_ACTION+rr in order that it may be distinguished from the reduce action for rule rr. All remaining undefined entries of the TERMINAL_ACTION vector are assigned ERROR_ACTION. Finally, the 0th entry of each Goto table row in BASE_ACTION is updated with the starting (0th) index of its corresponding terminal action matrix row in TERMINAL_ACTION. We note that all rows that were merged will have the same starting position within TERMINAL_ACTION.

With the new encoding of the actions, an entry whose value is less than or equal to the number of rules is a reduce or goto-reduce entry; an entry whose value is greater than the number of rules but less than ACCEPT_ACTION is a shift or goto entry; an entry whose value is greater than ERROR_ACTION is a shift-reduce action and the rule being reduced is obtained by subtracting ERROR_ACTION from the entry value.

The resulting compressed tables may be used with a standard LR parsing algorithm. At any point during the parse, there is a stack containing states with pending actions, a current state, a current terminal input symbol, and the sequence of remaining input. The stack initially contains the start state. The current state is always the state on the top of the state stack. With the compressed tables, the start state is a predetermined index into the BASE_ACTION table. This index is initially pushed onto the state stack. The current state is always an index into the BASE_ACTION table. The current state and current input symbol determine the next parsing action. This action is always a terminal symbol action. Thus the value of the BASE_ACTION table at the current state index gives the index in TERMINAL_ACTION where the terminal actions are found. Thus, if CD denotes the current state and CI the current input, then the parse action is the value of TERMINAL_ACTION(BASE_ACTION(CS)+CI), provided TERMINAL_CHECK(BASE_ACTION(CS)+CI) equals CI, and is TERMINAL_ACTION(BASE(ACTION(CS)) otherwise.

The terminal symbol action thus determined may be a reduce action (if the value is less than or equal to the number of rules), a shift action (if the value is greater than the number of rules but less than ACCEPT_ACTION), a shift-reduce action (if the value is greater than ERROR_ACTION), an accept action (if the value is ACCEPT_ACTION), or an error (if the value is ERROR_ACTION).

If it is a shift action, the new state is pushed on the state stack and the next input symbol becomes the current input symbol. If it is a reduce action, then a number of states equal to the length of the right-hand side of the rule being reduced is popped from the stack. The top of the stack becomes the current state and a Non-Terminal action is performed using the current state and left-hand side of the rule just reduced. If the action is a shift-reduce action, a reduce action is performed but with the length of the right-hand side diminished by one. If the action is the accept action, the parse has completed successfully. If the action is the error action, the parse has been blocked by an error in the input.

A Non-Terminal action uses the BASE_ACTION table, the current state, CS, and the left-hand side symbol, L, of the last reduced rule. The Non-Terminal action is the value of BASE_ACTION(CS+L), provided BASE_CHECK(CS+L) equals L, and is DEFAULT_GOTO(L) otherwise. This action is either a goto action or a goto-reduce action. In the first case, the value is pushed onto the state stack and becomes the current state. A terminal action on the current state and current symbol then takes place. In the second case, a reduce action is performed but with the length of the right-hand side diminished by one.

The above described method will be more clearly understood upon reference to the following example.

First the non-terminal action matrix is reduced and then compressed. Reduction of the number of non terminal actions achieved by using "default" goto actions. That is, from each column of the non-terminal matrix remove the action (goto or goto/reduce) that occurs most frequently. In case more than one occurs most often any one of the most frequent actions may be selected. The result is a vector of goto default actions indexed by non-terminal symbols. In the present example this vector is the default GoTo table as shown in FIG. 3.

This factorization eliminates 17 of the original 23 entries in the non-terminal action matrix. In the matrix the default action is replaced by an error (or vacant) entry. Thus, the non-terminal action matrix in the present example becomes as shown in FIG. 4.

There is a cost to this reduction step. The default goto table requires as much space as one row of the non-terminal action matrix. There is also a cost to obtaining a non-terminal action. Without defaulting goto's, a non-terminal action determined during a parse can never be an error action. With the goto's defaulted, a non-terminal error action indicates that the default action for the given non-terminal symbol must be taken. This is an extra check that must be made during the parse. When the non-terminal action matrix is compressed into a single vector, the check for an error will require an additional check vector. The use of goto default action is not a part of the present compression method, but it can be used with the method and usually results in substantial savings in table space.

The reduced non-terminal matrix is now compressed into a single action table and a check table. The check table is needed only if goto default actions are used. Compressing the matrix into a table essentially consists of shifting and overlaying the rows on each other.

One method is to proceed as follows: lay down the first row. Shift the second row one position to the right and test whether it can "overlay" the first row. One row can overlay another if in each position in which one has a non-error entry the other has an error (blank) entry. The overlay of the second onto the first is achieved by placing each non-error entry of the second into the corresponding position of the first. If an overlay is not possible, the second row is shifted another position to the right and the process is repeated. In the worst case the second row must be shifted completely to the right of the first row. It is assumed that to the right of the first row and to the left of the second row are error entries.

When the second row has been overlayed on the first, the result is considered the first row and the third row is considered the second row. The process is repeated until all of the rows of the matrix have been overlayed. To simplify, first all empty rows could be eliminated. In this example the result shown in FIG. 5 is obtained.

FIG. 5 shows where each row starts by placing its index under the corresponding table entry. Thus, row 3 starts in position 1, row 5 starts in position 2, etc. By numbering the non-terminal symbols to correspond to their column index in the non-terminal action matrix, finding a non-terminal action using this table requires simply taking the state number and finding the index of its action row in the table; to that index the non-terminal symbol number is added, one is subtracted from the result, and the final result is used to index the table, or

ACTION NO.=POSITION NO.+SYMBOL NO.−1.

Thus, to find the action for state 7 (which starts in position 4 in FIG. 5) and symbol number 2 (T), go to position $4+2-1$ (=5) and read the action G 11.

Since the go to defaults are being used, a check table is needed. This table has the same length as the compressed action table of FIG. 5, and contains the non-terminal symbol in each position for which an action is defined. The symbol Err is used to indicate an error or unused check table entry. A check table for use in the example under discussion is shown in FIG. 6.

To find the action for state 7 and symbol number 2 (T), the index is computed as 5, and a check is made as to whether the entry in the check table (FIG. 6) at that position is T. Since it is, the desired action, G 11, is obtained from the action table.

If the action for state 3 symbol number 3 (F) was desired, (GR4 as shown in FIG. 2) first compute the index $1+3-1=3$. Since the check table value at position 3 is not F but E the default goto table (FIG. 3) for F must be used to get the action GR4.

The above overlay technique gives a linear vector. But there are still many unused entries and 67% more space is required (10 positions instead of 6) then there are entries. The overlayed table may be further reduced by using the following technique according to the present invention.

First permute rows and columns so that they are ordered by the number of actions they contain. The row with the most actions will be first as will the column with the most actions. This tends to "triangularize" the action matrix so that most actions appear above the diagonal, whereas few actions occur below the diagonal. The result of this ordering on the reduced non-terminal action matrix of FIG. 4 is the action table shown in FIG. 7.

Here the rows for states that have no actions and the columns for non-terminals that also have no entries have been eliminated from the table in FIG. 4. Thus, column V has been eliminated, as have rows 1, 2, 4, 8, 10, and 11. The non-terminals eliminated are assigned numbers that follow the others.

Rows and columns that have the same number of entries can be placed interchangeably. Thus, columns R and T have the most entries (2 each) so these form the first two columns of the ordered matrix of FIG. 7. All the rows have the same number of entries, so these can also be arbitrarily place in the ordered matrix.

Since the action of the rows have been changed, in similar manner the go to default table also must change the resulting new goto default table is now as shown in FIG. 8.

Figure 10:
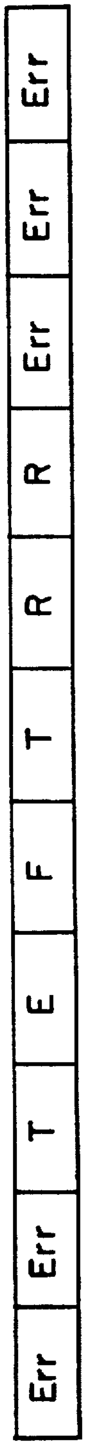

Using the previously described overlay algorithm, a non-terminal action action table and the check table such as shown in FIGS. 9 and 10 respectively for the purposes of explanation are obtained.

Here there are only two unused entries (33% extra space required). The check table is extended to the full length of the last row to ensure that the index is in range.

In the present invention, however, the tables of 7 and 9 may be improved upon. An improvement made possible by the present invention is to encode the state number by its index in the action table. In this example, state 6 may be numbered 1, state 3 numbered 3, etc. Then goto actions can be replaced by their state number. Some states, however, have no non-terminal actions (or have only default actions). Therefore, a table index must be assigned to each unused state as well. Furthermore, there is a need to located the start of the terminal actions for a given state in the terminal action table (whose construction will be explained later on). It is convenient, therefore, to add an extra column to the non-terminal action of the matrix of FIG. 7 that will provide the starting index for each state of its terminal actions. For example, the extra left hand column for the first row (state 6) would contain T6. If the matrix overlays perfectly, the length of the non-terminal action table will be the sum of the number of reduced matrix entries plus the number of states.

In practice, the single entries required for states having no terminal actions or only default actions fill the holes that remain from the overlay of the other rows, so a perfect packing results. In the example being discussed, incorporating an entry for each state's terminal actions gives the non-terminal action table shown in FIG. 11 which is derived from the "triangularized" non-terminal action matrix of FIG. 7.

Figure 11:
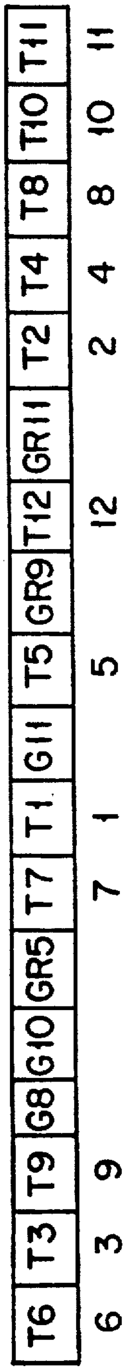

There is also a corresponding check table. The check table shown in FIG. 11, is generated in a similar manner to the check table of FIG. 9, but is shown in the non-terminal action table of FIG. 10. All zero or terminal entries are given an entry of Err (for error and go to entries are given the symbol determined in the column in FIG. 7 in which the go to entry appears.

Figure 13:
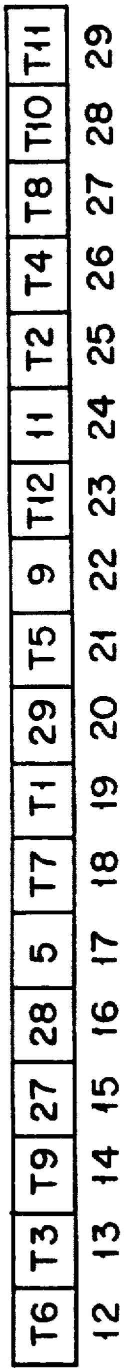

The start of the terminal actions for stake k are indicated by one TK. The state numbers now may be encoded by their starting indices in the action table. Also, the table is started at an index that is one greater than the number of rules. In this example there are 11 rules so the starting index is 12. For a goto action the encoded state number is used for example for GR5, the state action 5 used while for G8 the number 27 is used since state 8 is indexed at 16 in FIG. 11 and there are 11 rules, so that $11+16=27$. For a goto/reduce action the rule number stands for the action. Two indices are set aside at the end—one for the accept action and one for the error action. The resulting table is called the "base action table", and is shown in FIG. 13.

The accept action is encoded as 30 and the error action as 31 (not shown). When the terminal action table is built, (described below) its entries are indexed starting from one. When the starting index for the terminal actions for a given state k is determined, the entry for Tk in the base action table is set to that index.

Figure 12:
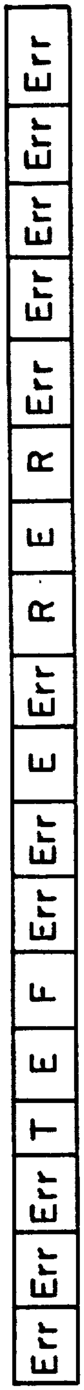

Next the reduction and compression of the terminal action matrix is considered. To reduce the number of entries, the rows that are compatible are identified. Two rows are "compatible" if their shift and shift reduce actions are identical and they have the same set of reduce actions, and whenever a reduce action is defined for one state and terminal symbol, then the other state has the same reduce action defined or no action defined for that terminal symbol. Examining the terminal action table of FIG. 1 shows that states 1 and 6 are compatible as are states 3, 7 and 9. This effectively removes 3 rows from the terminal action matrix. In the present example the resulting matrix is shown in FIG. 12.

The merging of compatible states eliminates 7 actions in this example (about 20%). More actions may be eliminated by taking default reductions. That is, with each state (row) factor out the reduction that occurs most frequently. That is the default reduction. If there is no reduction for a given row, use the error action as the default reduction. The result of taking default reductions in this example is shown in FIG. 15, in which the first column (def) shows the default action.

Taking default reductions in this example has saved 8 entries (about 20%). Thus, 15 of the 38 entries in the original matrix have already been eliminated.

Next apply the previously described ordering technique in which rows and columns are reordered according to their number of entries to ensure an efficient overlay of the rows. The result for the example under discussion is shown in FIG. 16. As noted previously the use of the ordering technique tends to triangularize the matrix.

Now, the overlay of the rows is performed to obtain the terminal action table. A check table is also needed. If the terminal symbol does not match the check symbol, the default action for the state is taken. This action will be either a reduction or the error action. The result of the overlay using the example under consideration are the terminal action and check tables shown in FIGS. 17 and 18, respectively.

Here the packing is perfect and there are no unused entries. All that remains is to assign the proper starting index to the terminal action table and terminal check table and encode all of the actions. A shift action is represented by the index of the shifted state in the base action table (FIG. 13). A shift reduce action is encoded by adding the index of the error entry of the base action table to the number of the rule being reduced. A reduce action is encoded by the rule number of the rule being reduced. The accept action is encoded by the index of accept (30) in the base action table. The error action is encoded by the index of error (31) in the base action table. This is shown in FIG. 19.

Indices for the terminal symbols used for the final terminal check table are assigned based on the ordering of the columns of the ordered terminal action matrix (FIG. 16). In the terminal check table, zero is used for error entries. In the present example the final terminal action table and terminal check table are shown in FIGS. 19 and 20, respectively.

Using the indices of the states in the terminal action table of FIG. 19, the base action table can now be completed. In the example, the final base action table is shown in FIG. 21, the final non-terminal check table is shown in FIG. 22, and the goto default table is shown in FIG. 23.

Having thus described our invention, what we claim as new, and desire to secure by Letters Patent is:

1. A method for compressing terminal and non-terminal action matrices to produce a reduced LR parsing table for use in compiling computer programs, said parsing table consisting of rows and columns, said rows and columns corresponding to either symbols or states, said action matrices containing action to be taken determined by a current input symbol and a current state, said method comprising the steps performed by a computer of:

compressing a non-terminal action matrix, said step of compressing said non-terminal action matrix comprising the substeps of:

reducing said non-terminal action matrix to a reduced table and a default table;

permuting said rows and columns of said reduced table in accordance with their number of non-error entries to form a permuted matrix;

reducing said permuted matrix to a single linear vector having spaces identified by index numbers and generating a check table;

encoding each of said states by said index numbers; and compressing a terminal action matrix, said step of compressing said terminal action matrix comprising the substeps of:

reducing said terminal action matrix to eliminate compatible rows;

adding a default column to said reduced terminal action matrix for controlling default actions and eliminating entries occurring more than once in said reduced terminal action matrix, and placing their value in said default column, and if there is no multiply occurring entry in a row, placing an error value in said default column;

permuting said rows and columns in accordance with the number of non-error entries in said rows and columns to create an ordered table;

reducing said ordered table to a terminal action vector;

generating a terminal check table;

adjoining a proper starting index to said terminal action vector and said terminal check table;

encoding all actions; and using said reduced LR parsing table in compiling computer programs.

2. The method of claim 1 wherein:

said substep of reducing said non-terminal action matrix to a reduced table and a default table comprises:

identifying said action which occurs most frequently in said columns;

removing said most frequently occurring action for a given non-terminal and inserting said most frequently occurring action in said default table, said reduced table comprising said non-terminal action matrix after said most frequently occurring actions have been removed;

said substep of permuting said rows and columns of said reduced table comprises:

ordering said reduced table such that a row having a greater number of non-error entries than any other row comprises a first row and each subsequent row of said matrix contains a number of non-error entries equal to or less than the number of non-error entries in previous rows of said matrix;

ordering said matrix such that a column having the largest number of non-error entries comprises a first column and each subsequent column contains a number of non-error entries equal to or less than the number of non-error entries in previous rows of said matrix;

said substep of reducing said permuted matrix to a single linear vector comprises:

concatenating said rows in a linear fashion, starting with said first row;

said substep of generating a check table comprises:

creating a linear check table identical in size to said single linear vector;

inserting into said check table at each position corresponding to an action entry of said single linear vector a non-terminal symbol for said action entry;

said step of encoding each said state comprises:

assigning each said state an index number corresponding to said action entries in said single linear vector.

3. The method of claim 2 wherein:

said linking of said rows in a linear fashion comprises:

forming a linear vector including a number of unfilled spaces greater than the number of spaces in one of said rows;

inserting said first row of said permuted matrix in place of a first group of unfilled spaces in said linear vector;

inserting subsequent rows of said permuted matrix in said linear matrix, said subsequent rows including subsequent error and non-error entries;

where said subsequent non-error entries correspond to error entries in previous rows, said subsequent non-error entries replace said error entries in previous rows; and where said subsequent non-error entries do not correspond to error entries in previous rows, said subsequent non-error entries replace said unfilled spaces in said vector.

4. The method of claim 1 wherein:

said substep of reducing said terminal action matrix to eliminate compatible rows comprises:

merging said compatible rows to form a single representative row;

said substep of adding a default column to said reduced terminal action matrix wherein said matrix includes reduce actions, comprises:

identifying said reduce action which occurs most frequently in a particular row;

moving a most frequently occurring reduce action to said default columns and replacing said most frequently occurring reduce action with error values in said matrix, forming a reduced matrix;

said substep of permuting said rows and columns to create an ordered table comprises:

ordering said reduced matrix such that a row having the largest number of non-error entries comprises a first row and each subsequent row of said matrix contains a number of non-error entries equal to or less than the number of non-error entries in previous rows of said matrix;

ordering said reduced matrix such that a column having the largest number of non-error entries comprises a first column and each subsequent column contains a number of non-error entries equal to or less than the number of non-error entries in previous rows of said matrix;

said substep of reducing said ordered table to a single linear vector comprises:

concatenating said rows in a linear fashion, starting with said first row;

said substep of generating a terminal check table comprises:

creating a linear terminal check table identical in size to said single linear vector;

inserting into said check table at each position corresponding to an action entry of said linear vector a terminal symbol for that action entry;

said step of encoding each of said states comprises:

assigning each of said states an index number corresponding to said action entry in said single linear vector.

5. The method of claim 4 wherein:

said linking of said rows in a linear fashion comprises:

forming a linear vector including a number of unfilled spaces greater than the number of spaces in one of said rows;

inserting said first row of said ordered table in place of a first group of unfilled spaces in said linear vector;

inserting subsequent rows of said ordered table in said linear matrix, said subsequent rows including subsequent error and non-error entries;

where said subsequent non-error entries correspond to error entries in previous rows, said subsequent non-error entries replace said error entries in previous rows; and where said subsequent non-error entries do not correspond to error entries in previous rows, said non-error entries replace unfilled spaces in said matrix.

6. A compressed non-terminal action matrix, compressed from a non-terminal action matrix containing actions to be taken determined by a current input symbol and a current state, said non-terminal action matrix being compressed, to produce a part of a reduced LR parsing table for use in compiling computer programs, by a method comprising the steps, performed by a computer, of:

reducing said non-terminal action matrix to a reduced table and a default table;

permuting said rows and columns of said reduced table in accordance with their number of non-error entries to form a permuted matrix;

reducing said permuted matrix to a single linear vector having spaces identified by index numbers and generating a check table;

encoding each said state by said index numbers; and using said compressed non-terminal action matrix in compiling computer programs.

7. The method of claim 6 wherein:

said step of reducing said non-terminal action matrix to a reduced table and a default table comprises:

identifying said action which occurs most frequently in said column;

removing said most frequently occurring action for a given non-terminal and inserting said most frequently occurring action in said default table, said reduced table comprising said non-terminal action matrix after said most frequently occurring actions have been removed;

said step of permuting said rows and columns of said reduced table comprises:

ordering said reduced table such that a row having a greater number of non-error entries than any other row comprises a first row and each subsequent row of said matrix contains a number of non-error entries equal to or less than the number of non-error entries in previous rows of said matrix;

ordering said matrix such that a column having the largest number of non-error entries comprises a first column and each subsequent column contains a number of non-error entries equal to or less than the number of non-error entries in previous rows of said matrix;

said step of reducing said permuted matrix to a single linear vector comprises:

concatenating said rows in a linear fashion, starting with said first row;

said step of generating a check table comprises:

creating a linear check table identical in size to said single linear vector;

inserting into said check table at each position corresponding to an action entry of said single linear vector a non-terminal symbol for said action entry;

said step of encoding each said state comprises:

assigning each said state an index number corresponding to said action entries in said single linear vector.

8. The method of claim 7 wherein:

said linking of said rows in a linear fashion comprises:

forming a linear vector including a number of unfilled spaces greater than the number of spaces in one of said rows;

inserting said first row of said permuted matrix in place of a first group of unfilled spaces in said linear vector;

inserting subsequent rows of said permuted matrix in said linear matrix, said subsequent rows including subsequent error and non-error entries;

where said subsequent non-error entries correspond to error entries in previous rows, said subsequent non-error entries replace said error entries in previous rows; and where said subsequent non-error entries do not correspond to error entries in previous rows, said subsequent non-error entries replace said unfilled spaces in said vector.

9. A compressed terminal action matrix, compressed from a terminal action matrix containing actions to be taken determined by a current input symbol and a current state, said terminal action matrix being compressed, to produce a part of a reduced LR parsing table for use in compiling computer programs, by a method comprising the steps, performed by a computer, of:

reducing said terminal action matrix to eliminate compatible rows;

adding a default column to said reduced terminal action matrix for controlling default actions and eliminating entries occurring more than once in said reduced terminal action matrix, and placing their value in said default column, and if there is no multiply occurring entry in a row, placing an error value in said default column;

permuting said rows and columns in accordance with the number of non-error entries in said rows and columns to create an ordered table;

reducing said ordered table to a terminal action vector;

generating a terminal check table;

adjoining a proper starting index to said terminal action vector and said terminal check table;

encoding all actions; and using said compressed terminal action matrix in compiling computer programs.

10. The method of claim 9 wherein:

said step of reducing said terminal action matrix to eliminate compatible rows comprises:

merging said compatible rows to form a single representative row;

said step of adding a default column to said reduced terminal action matrix wherein said matrix includes reduce actions, comprises:

identifying said reduce action which occurs most frequently in a particular row;

moving said most frequently occurring reduce action to said default columns and replacing said most frequently occurring reduce action with error values in said matrix, forming a reduced matrix;

said step of permuting said rows and columns to create an ordered table comprises:

ordering said reduced matrix such that a row having the largest number of non-error entries comprises a first row and each subsequent row of said matrix contains a number of non-error entries equal to or less than the number of non-error entries in previous rows of said matrix;

ordering said reduced matrix such that a column having the largest number of non-error entries comprises a first column and each subsequent column contains a number of non-error entries equal to or less than the number of non-error entries in previous rows of said matrix;

said step of reducing said ordered table to a single linear vector comprises:

concatenating said rows in a linear fashion, starting with said first row;

said step of generating a terminal check table comprises:

creating a linear terminal check table identical in size to said single linear vector;

inserting into said check table at each position corresponding to an action entry of said linear vector a terminal symbol for that action entry;

said step of encoding each said state comprises:

assigning each of said state an index number corresponding to said action entry in said single linear vector.

11. The method of claim 10 wherein:

said linking of said rows in a linear fashion comprises:

forming a linear vector including a number of unfilled spaces greater than the number of spaces in one of said rows;

inserting said first row of said ordered table in place of a first group of unfilled spaces in said linear vector;

inserting subsequent rows of said ordered table in said linear matrix, said subsequent rows including subsequent error and non-error entries;

where said subsequent non-error entries correspond to error entries in previous rows, said subsequent non-error entries replace said error entries in previous rows; and where said subsequent non-error entries do not correspond to error entries in previous rows, said non-error entries replace unfilled spaces in said matrix.

* * * * *